(12) United States Patent
Sakai

(10) Patent No.: US 9,960,721 B2
(45) Date of Patent: May 1, 2018

(54) MOTOR CONTROL DEVICE PROVIDED WITH POWER FAILURE MANAGEMENT

(71) Applicant: FANUC CORPORATION, Minamitsuru-gun, Yamanashi (JP)

(72) Inventor: Koujirou Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 14/244,140

(22) Filed: Apr. 3, 2014

(65) Prior Publication Data

US 2014/0306634 A1    Oct. 16, 2014

(30) Foreign Application Priority Data

Apr. 10, 2013    (JP) .................................. 2013-082452

(51) Int. Cl.

| G01R 31/02 | (2006.01) |
|---|---|
| H02H 3/04 | (2006.01) |
| H02P 23/00 | (2016.01) |
| H02P 27/08 | (2006.01) |
| H02P 29/032 | (2016.01) |

(52) U.S. Cl.
CPC ............ *H02P 23/00* (2013.01); *H02P 27/085* (2013.01); *H02P 29/032* (2016.02)

(58) Field of Classification Search
CPC ................................ H02P 29/021; H02P 27/06
USPC ........................................................ 318/490
See application file for complete search history.

(56) References Cited

U.S. PATENT DOCUMENTS

| 5,777,450 A | 7/1998 | Kono et al. |
|---|---|---|
| 5,814,956 A | 9/1998 | Kono et al. |
| 6,133,651 A | 10/2000 | Kono et al. |
| 2003/0076066 A1 | 4/2003 | Iwashita et al. |
| 2011/0234141 A1 | 9/2011 | Kataoka et al. |

FOREIGN PATENT DOCUMENTS

| CN | 101687467 A | 3/2010 |
|---|---|---|
| JP | 6189561 A | 7/1994 |
| JP | 7-177794 A | 7/1995 |
| JP | 8-54914 A | 2/1996 |
| JP | 9-51605 A | 2/1997 |
| JP | 10-271866 A | 10/1998 |
| JP | 11-256440 A | 9/1999 |
| JP | 3369346 B2 | 1/2003 |
| JP | 3472433 B2 | 12/2003 |
| JP | 2004112929 A | 4/2004 |
| JP | 2004140919 A | 5/2004 |
| JP | 3541121 B2 | 7/2004 |
| JP | 3616759 B2 | 2/2005 |
| JP | 2005-192298 A | 7/2005 |
| JP | 200687155 A | 3/2006 |
| JP | 2007135311 A | 5/2007 |

(Continued)

*Primary Examiner* — Erick Glass
(74) *Attorney, Agent, or Firm* — Hauptman Ham, LLP

(57) ABSTRACT

A power failure detection unit in an AC-DC converter device detects power failure of a 3-phase AC power supply at the time of driving a motor, and generates a power failure detection signal in accordance with detection of power failure. A transmitter unit in the AC-DC converter device transmits the power failure detection signal using a cable, radio, or an optical fiber. A receiver unit in a DC-AC converter device receives the power failure detection signal transmitted from the transmitter unit.

9 Claims, 8 Drawing Sheets

(56) References Cited

FOREIGN PATENT DOCUMENTS

| | | |
|---|---:|---:|
| JP | 4154679 B2 | 9/2008 |
| JP | 4154679 B2 | 11/2008 |
| JP | 2011-101474 A | 5/2011 |
| JP | 2011-209936 A | 10/2011 |
| JP | 2012147621 A | 8/2012 |
| JP | 2012152008 A | 8/2012 |
| JP | 2012188201 A | 10/2012 |
| JP | 2012244879 A | 12/2012 |

MOTOR CONTROL DEVICE PROVIDED WITH POWER FAILURE MANAGEMENT

RELATED APPLICATIONS

The present application claims priority to Japanese Application Number 2013-082452, filed Apr. 10, 2013, the disclosure of which is hereby incorporated by reference herein in its entirety.

BACKGROUND OF THE INVENTION

Field of the Invention

The present invention relates to a motor control device provided with power failure management in AC power supply failure at the time of driving a motor.

Description of the Related Art

Conventionally, as disclosed in Japanese Laid-open Patent Publication No. 2011-101474, Japanese Laid-open Patent Publication No. 2011-209936, Japanese Patent No. 3,472,433, and Japanese Patent No. 3,616,759, for instance, there is proposed a motor control device provided with a power failure detection unit configured to detect AC power supply failure at the time of driving a motor and to generate a power failure detection signal in accordance with detection of power failure, and a control unit configured to control the motor for stopping the motor in response to detection of power failure, as a motor control device provided with power failure management in AC power supply failure at the time of driving a motor. In this configuration, internal wiring is disposed between the output line of AC power supply and the power failure detection unit.

Further, as disclosed in Japanese Laid-open Patent Publication No. Hei 10-271866, Japanese Patent No. 3,369,346, and Japanese Patent No. 4,154,679, for instance, there is proposed a motor control device provided with a power failure detection unit configured to detect AC power supply failure at the time of driving a motor and to generate a power failure detection signal in accordance with detection of power failure, and a control unit configured to control the motor for retracting a driven body driven by the motor in response to detection of power failure, as a motor control device provided with power failure management in AC power supply failure at the time of driving a motor. In this configuration, internal wiring is disposed between the output line of AC power supply and the power failure detection unit, as well as the above configuration.

Furthermore, as disclosed in Japanese Patent No. 3,541,121, for instance, there is proposed a motor control device provided with a power failure detection unit configured to detect AC power supply failure at the time of driving a motor and to generate a power failure detection signal in accordance with detection of power failure, and an electric power supply unit configured to supply electric power to a DC link unit configured to accumulate electric power for driving the motor in response to detection of power failure, as a motor control device provided with power failure management in AC power supply failure at the time of driving a motor. In this configuration, internal wiring is disposed between the output line of AC power supply and the power failure detection unit, as well as the above configuration.

When a plurality of motors are controlled in order to stop a motor or an retract a driven body driven by the motor in AC power supply failure at the time of driving the motor, a plurality of DC-AC converter devices corresponding to the respective motors are individually configured. Therefore, it would be necessary to provide a power failure detection unit and a control unit for each of the DC-AC converter devices, in other words, to use power failure detection units and control units respectively corresponding to DC-AC converter devices.

The power failure detection timings by power failure detection units may differ from each other by variation of components constituting each of the power failure detection units. Further, the power failure detection timings by power failure detection units may differ from each other by an influence of voltage drop in internal wiring disposed between the output line of AC power supply and a power failure detection unit. Furthermore, the power failure detection timings by power failure detection units may differ from each other by a difference in instantaneous power failure tolerance amount of a device, in which each of the power failure detection units is installed.

Therefore, control for power failure management in AC power supply failure at the time of driving a motor may be complicated in order to avoid adverse effects due to different power failure detection timings by power failure detection units on motor control.

Further, when electric power is supplied to a DC link unit, in addition to motor control for stop a motor or retracting a driven body driven by the motor in AC power supply failure at the time of driving the motor, it would be necessary to use both a power failure detection unit with respect to a control unit and a power failure detection unit with respect to an electric power supply unit.

The power failure detection timing by a power failure detection unit with respect to a control unit may differ from the power failure detection timing by a power failure detection unit with respect to an electric power supply unit due to variation of components constituting each of the power failure detection units. Further, the power failure detection timing by a power failure detection unit with respect to a control unit may differ from the power failure detection timing by a power failure detection unit with respect to an electric power supply unit due to a difference in instantaneous power failure tolerance amount of a device, in which each of the power failure detection units is installed.

Adverse effects due to a difference between the power failure detection timing by a power failure detection unit with respect to a control unit and the power failure detection timing by a power failure detection unit with respect to an electric power supply unit may affect the motor control. For instance, although power failure is detected by a power failure detection unit with respect to a control unit, power failure may not be detected by a power failure detection unit with respect to an electric power supply unit. In this case, it is impossible to stop a motor or retract a driven body driven by the motor in AC power supply failure at the time of driving the motor.

As described above, control for power failure management in AC power supply failure at the time of driving a motor may be complicated in order to avoid adverse effects due to a difference between the power failure detection timing by a power failure detection unit with respect to a control unit and the power failure detection timing by a power failure detection unit with respect to an electric power supply unit on motor control. The aforementioned control may be further complicated, as the number of devices equipped with a power failure detection unit increases. This makes it difficult to extend a device such as a power failure management device.

SUMMARY OF THE INVENTION

An object of the invention is to provide a motor control device that enables simplification of the control for power failure management in AC power supply failure at the time of driving a motor, and enables easily extending of the power failure management.

A motor control device according to an aspect is a motor control device for controlling a motor to be driven by electric power accumulated in a DC link unit connected to an AC power supply via a converter. The motor control device is provided with one first device including a power failure detection unit configured to detect power failure of the AC power supply at a time of driving the motor and to generate a power failure detection signal in accordance with detection of power failure, and a transmitter unit configured to transmit the power failure detection signal; and at least one second device including a receiver unit configured to receive the power failure detection signal transmitted from the transmitter unit.

Preferably, the transmitter unit may transmit the power failure detection signal to the receiver unit using a cable, radio, or an optical fiber.

Preferably, the first device may be constituted of an AC-DC converter device including the converter, the DC link unit, the power failure detection unit, and the transmitter unit; and the second device may be constituted of a DC-AC converter device including the receiver unit.

Preferably, the first device may be constituted of an AC-DC converter device including the converter, the DC link unit, the power failure detection unit and the transmitter unit, and a DC-AC converter device connected to the AC-DC converter device; and the second device may be constituted of an electric power management device including a receiver unit, and configured to provide electric power management in power failure of the AC power supply at the time of driving the motor in response to receiving the power failure detection signal by the receiver unit.

Preferably, the first device may be constituted of an AC-DC converter device including the converter, the DC link unit, the power failure detection unit, and the transmitter unit; and the second device may be constituted of a DC-AC converter device including the receiver unit, and an electric power management device configured to provide electric power management in power failure of the AC power supply at the time of driving the motor in response to receiving the power failure detection signal by the receiver unit.

Preferably, the electric power management device may include a regenerative electric power consumption control unit configured to control such that regenerative electric power generated at a time of decelerating the motor is consumed in response to receiving the power failure detection signal by the receiver unit.

Preferably, the electric power management device may include an electric power supply control unit configured to control electric power supply in response to receiving the power failure detection signal by the receiver unit.

BRIEF DESCRIPTION OF THE DRAWINGS

The invention will be more clarified by referring to the accompanying drawings in which.

DETAILED DESCRIPTION

Figure 1:
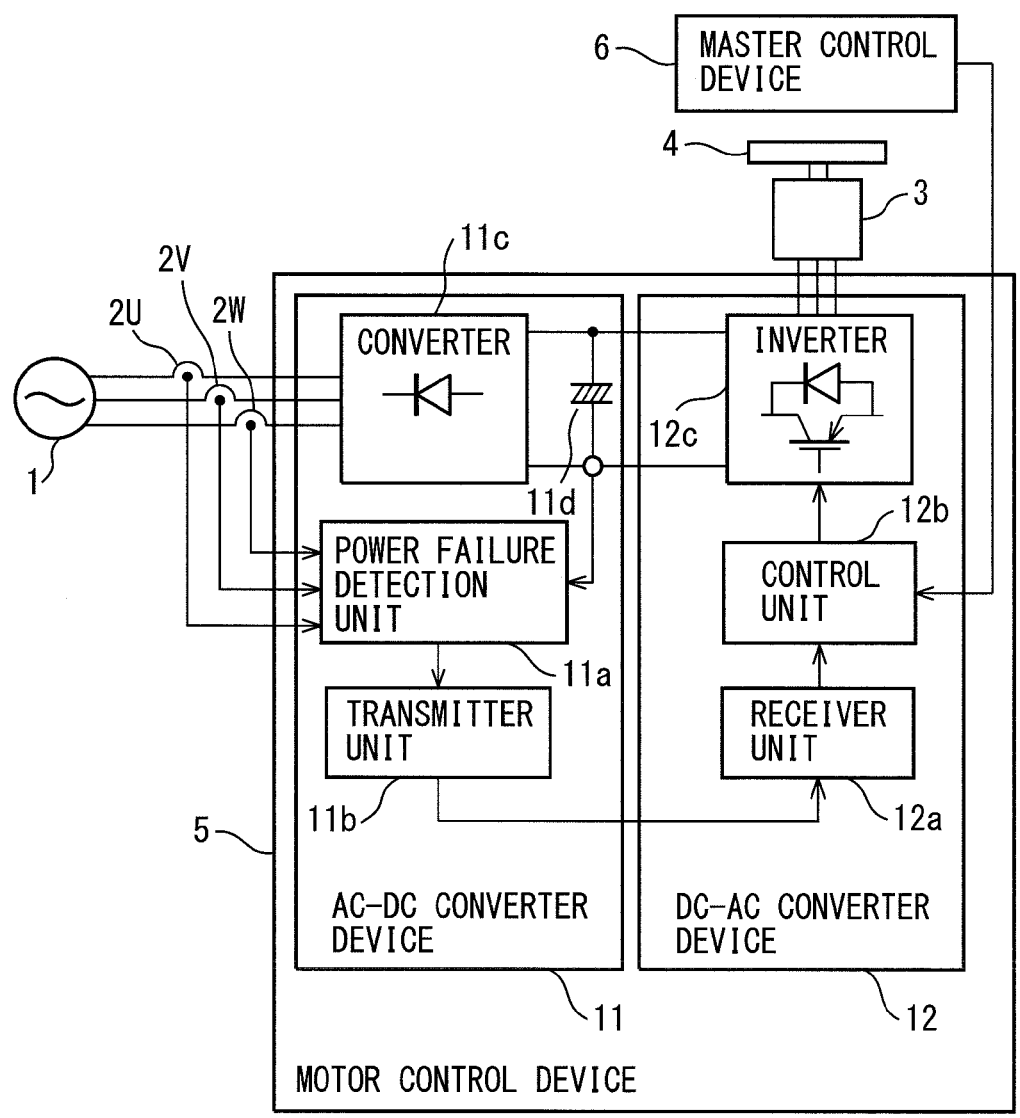
FIG. 1 is a diagram illustrating a system provided with a motor control device according to a first embodiment.

In the following, a motor control device provided with power failure management is described referring to the drawings. It should be noted, however, that the invention is not limited to the drawings or the embodiments described in the following. In the drawings, the same constituent elements are indicated by the same reference numerals.

FIG. 1 is a diagram illustrating a system provided with a motor control device according to a first embodiment. The system illustrated in FIG. 1 is used in a machine tool. The system illustrated in FIG. 1 is provided with a 3-phase AC power supply 1 as an AC power supply, voltage detectors 2U, 2V, 2W, a motor 3, a driven body 4, a motor control device 5, and a master control device 6.

The voltage detectors 2U, 2V, 2W are provided on the output line of the 3-phase AC power supply 1 for detecting voltages of three phases i.e. U-phase voltage, V-phase voltage, W-phase voltage. Examples of the motor 3 include a gravity axis servo motor configured to drive the main shaft of a machine tool in the gravity axis direction (in Z-axis direction) by a screw feeding mechanism such as a ball screw/nut mechanism, a main shaft motor configured to drive a tool mounted on the main shaft of a machine tool, and a horizontal axis servo motor configured to drive a table of a machine tool on which a workpiece is mounted in the horizontal axis direction (e.g. in X-axis direction) by a screw feeding mechanism such as a ball screw/nut mechanism.

The driven body 4 may be the main shaft of a machine tool when the motor 3 is a gravity axis servo motor, may be a tool when the motor 3 is a main shaft motor, and may be a table of a machine tool when the motor 3 is a horizontal axis servo motor.

The motor control device 5 is provided with an AC-DC converter device 11 as a first device, and a DC-AC converter device 12 as a second device. The AC-DC converter device 11 has a power failure detection unit 11a, a transmitter unit 11b, a converter 11c, and a DC link unit 11d. The DC-AC converter device 12 has a receiver unit 12a, a control unit 12b, and an inverter 12c.

The power failure detection unit 11a is configured to detect power failure of the 3-phase AC power supply 1 at the time of driving the motor 3 by monitoring a voltage of the 3-phase AC power supply 1 and a voltage of the DC link unit 11d, and to generate a power failure detection signal in accordance with detection of power failure. In order to perform the above control, the power failure detection unit 11a is provided with a rectifier circuit (not illustrated) having a plurality of (six in 3-phase AC power supply) rectifier diodes for rectifying 3-phase voltages of U-phase voltage, V-phase voltage, W-phase voltage to be detected by the voltage detectors 2U, 2V, 2W provided on the output line of the 3-phase AC power supply 1, and a comparator (not illustrated) configured to compare between the level of an output signal from the rectifier circuit and a reference level and to generate a power failure detection signal when the output signal level is lower than the reference level. The power failure detection unit 11a is further provided with a voltage detection unit (not illustrated) configured to detect a voltage of the DC link unit 11d, a calculation unit (not illustrated) configured to calculate a decrease amount of the detected voltage per unit time, and another comparator (not illustrated) configured to compare between the calculated decrease amount and a predetermined reference amount, and to generate a power failure detection signal when the decrease amount is larger than the reference amount.

The transmitter unit 11b is constituted of an input/output port, for instance, and is configured to transmit a power failure detection signal to the receiver unit 12a using a cable, radio, or an optical fiber. The converter 11c is constituted of a plurality of (six in 3-phase AC power supply) rectifier diodes, for instance, and is configured to convert AC power supplied from the 3-phase AC power supply 1 into DC power. The DC link unit 11d is constituted of a smoothing capacitor, for instance, and is connected in parallel to the converter 11c for smoothing a voltage rectified by the rectifier diodes in the converter 11c. By performing the above control, the motor 3 is driven by electric power accumulated in the DC link unit 11d.

The receiver unit 12a is constituted of an input/output port, for instance, and is configured to receive a power failure detection signal transmitted from the transmitter unit 11b. The control unit 12b is configured to generate a PWM signal for driving the motor 3, based on current values of currents of three phases, namely, U-phase current, V-phase current, and W-phase current detected by a current detector (not illustrated) provided on the output line of the inverter 12c, a position of the motor 3 detected by a position detector (not illustrated), a speed of the motor 3 to be determined based on the position of the motor 3, a position command value to be input from the master control device 6, and a speed command value to be determined based on the position command value; and to output the generated PWM signal to the inverter 12c.

The inverter 12c is constituted of a plurality of (six in 3-phase AC power supply) rectifier diodes and transistors connected in reverse parallel to the respective corresponding rectifier diodes, for instance. The inverter 12c is connected in parallel to the DC link unit 11d, and is configured to convert DC power converted by the converter 11c into AC power for driving the motor 3 by performing on-off operations of the transistors based on the PWM signal.

As described above, the motor control device 5 controls the motor 3 to be driven by electric power accumulated in the DC link unit 11d connected to the 3-phase AC power supply 1 via the converter 11c. In the embodiment, the control unit 12b controls the motor 3 so that an operation of stopping the motor 3 or an operation of retracting the driven body 4 to be driven by the motor 3 is performed in response to receiving a power failure detection signal from the receiver unit 12a. Specifically, the motor control device 5 is configured to detect power failure of the 3-phase AC power supply 1 at the time of driving the motor 3, and to control the motor 3 so that an operation of stopping the motor 3 or an operation of retracting the driven body 4 to be driven by the motor 3 is performed in accordance with detection of power failure.

The master control device 6 is constituted of a CNC (computer numeric control), and is configured to input a position command value to the control unit 12b for controlling the motor control device 5.

The power failure detection unit 11a and the transmitter unit 11b are implemented by a first processor (not illustrated) provided with an input/output port, a serial communication circuit, an A/D converter, and a comparator for detecting power failure of the 3-phase AC power supply 1 in accordance with a power failure detection program stored in a memory (not illustrated).

The receiver unit 12a and the control unit 12b are implemented by a second processor (not illustrated) provided with an input/output port, a serial communication circuit, an A/D converter, and a comparator for executing control of the motor 3 in accordance with a motor control program stored in a memory (not illustrated).

According to the embodiment, it is not necessary to provide a power failure detection unit for each of the AC-DC converter device 11 and the DC-AC converter device 12 constituted as individual devices. Specifically, one power failure detection unit 11a is provided in place of a plurality of power failure detection units, a power failure detection signal generated in the power failure detection unit 11a is transmitted from the transmitter unit 11b to the receiver unit 12a, and the control unit 12b provides power failure management in power failure of the 3-phase AC power supply 1 at the time of driving the motor 3 in response to receiving the power failure detection signal from the receiver unit 12a.

As described above, detecting power failure of the 3-phase AC power supply 1 on the AC-DC converter device 11 side, and transmitting a power failure detection signal from the transmitter unit 11b in the AC-DC converter device 11 to the receiver unit 12a in the DC-AC converter device 12 using a cable, radio, or an optical fiber does not require complicated control for power failure management so that adverse effects due to different power failure detection timings by power failure detection units do not affect control of the motor 3. The above configuration is advantageous in simplifying the control for power failure management in power failure of the 3-phase AC power supply 1 at the time of driving the motor 3. Further, providing one power failure detection unit 11a in place of a plurality of power failure detection units makes it possible to simplify the system illustrated in FIG. 1.

Figure 2:
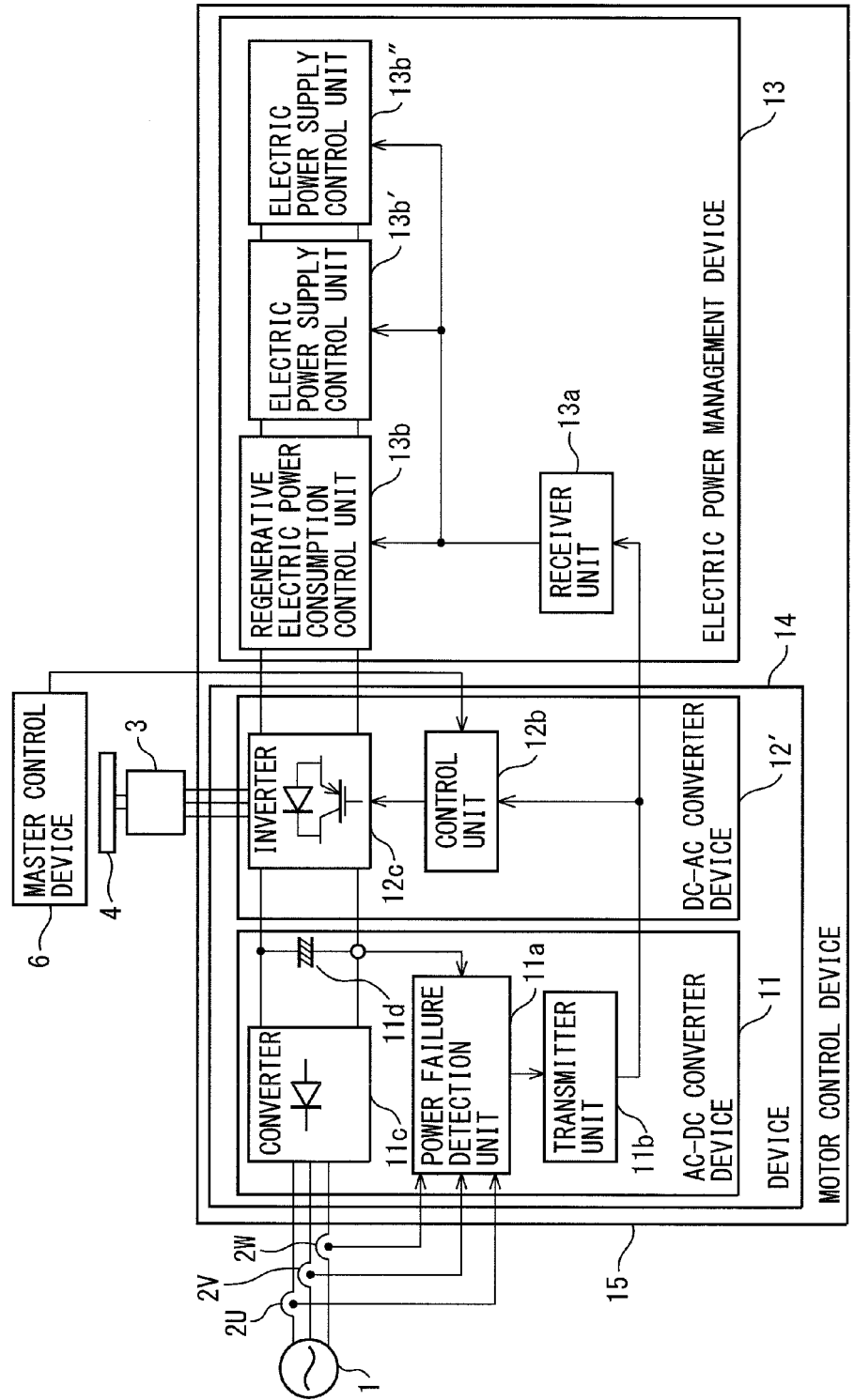
FIG. 2 is a diagram illustrating a system provided with a motor control device according to a second embodiment.

FIG. 2 is a diagram illustrating a system provided with a motor control device according to a second embodiment. The system illustrated in FIG. 2 is provided with a 3-phase AC power supply 1, voltage detectors 2U, 2V, 2W, a motor 3, a driven body 4, a motor control device 15, and a master control device 6.

The motor control device 15 is provided with an AC-DC converter device 11 and a DC-AC converter device 12', and an electric power management device 13 as a second device. The DC-AC converter device 12' has a control unit 12b and an inverter 12c. The electric power management device 13 has a receiver unit 13a, a regenerative electric power consumption control unit 13b, an electric power supply control unit 13b', and an electric power supply control unit 13b". In the embodiment, the AC-DC converter device 11 and the DC-AC converter device 12' connected thereto constitute a device 14 as a first device.

In the embodiment, the motor control device 15 is configured to detect power failure of the 3-phase AC power supply 1 at the time of driving the motor 3, and to control the motor 3 so that an operation of stopping the motor 3 or an operation of retracting the driven body 4 to be driven by the motor 3 is performed in accordance with detection of power failure; and to provide electric power management in power failure of the 3-phase AC power supply 1 at the time of driving the motor 3.

In order to perform the above control, a transmitter unit 11b is configured to transmit a power failure detection signal to the receiver unit 13a using a cable, radio, or an optical fiber; and the electric power management device 13 provides electric power management in power failure of the 3-phase AC power supply 1 at the time of driving the motor 3 in response to receiving the power failure detection signal from the receiver unit 13a.

Figure 3:
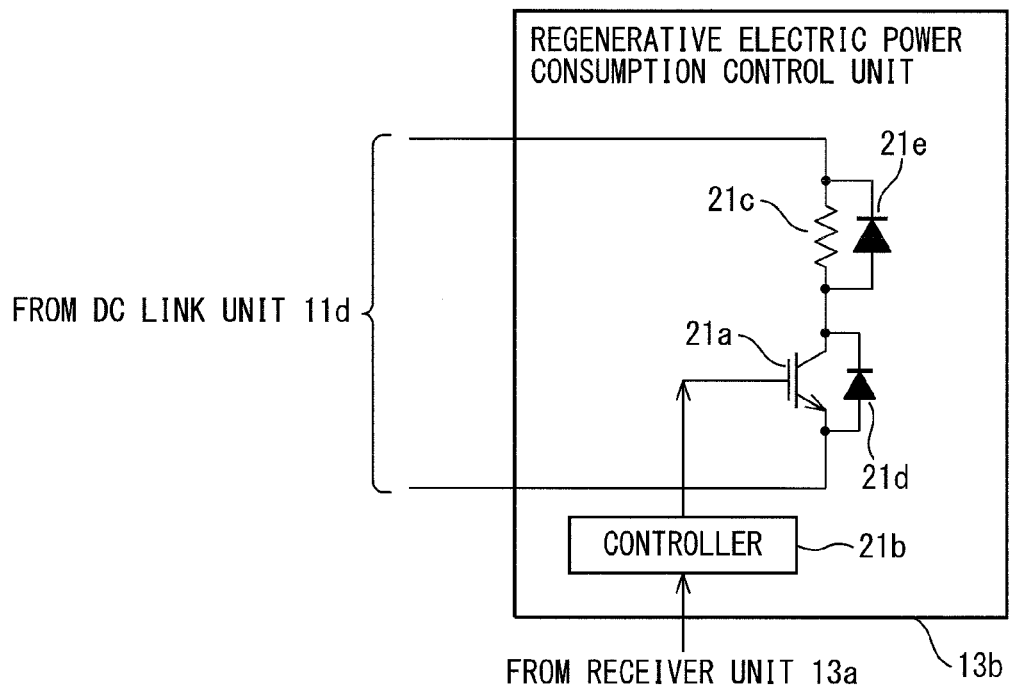
FIG. 3 is a detailed diagram of a regenerative electric power consumption control unit illustrated in FIG. 2.

The receiver unit 13a is constituted of an input/output port, for instance, and is configured to receive a power failure detection signal transmitted from the transmitter unit 11b as described above. The regenerative electric power consumption control unit 13b controls to consume regenerative electric power generated at the time of decelerating the motor 3 in response to receiving a power failure detection signal from the receiver unit 13a. FIG. 3 is a detailed diagram of the regenerative electric power consumption control unit illustrated in FIG. 2. As illustrated in FIG. 3, the regenerative electric power consumption control unit 13b is connected in parallel to a DC link unit 11d, and has an NPN transistor (IGBT) 21a as a reflux transistor, a controller 21b, and a regenerative resistor 21c.

The controller 21b turns on the NPN transistor 21a in response to receiving a power failure detection signal from the receiver unit 13a. The regenerative resistor 21c consumes regenerative energy generated at the time of driving and decelerating the motor 3 when the NPN transistor 21a is in an on-state. In the embodiment, a diode 21d is connected in parallel to the NPN transistor 21a, and a diode 21e is connected in parallel to the regenerative resistor 21c.

Figure 4:
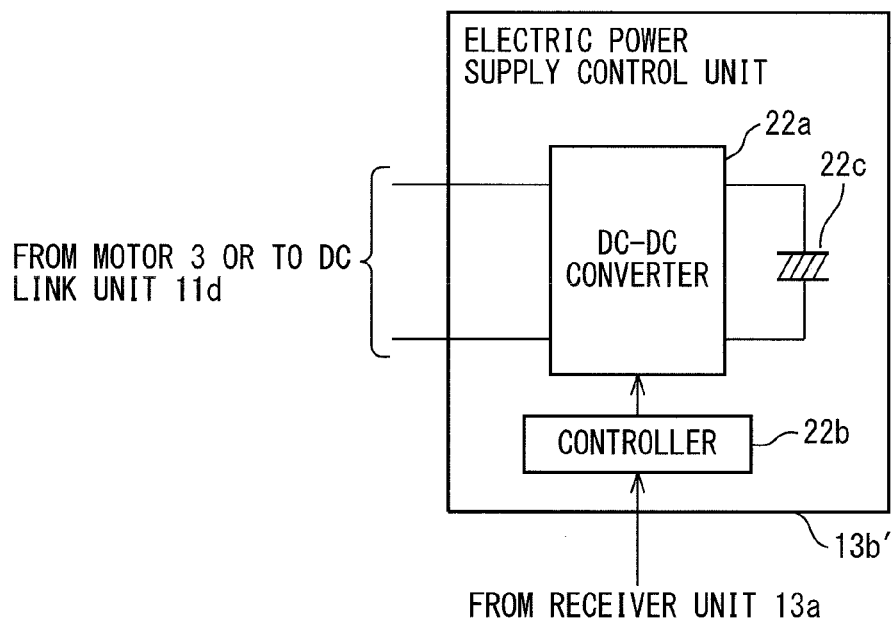
FIG. 4 is a detailed diagram of an electric power supply control unit illustrated in FIG. 2.

The electric power supply control unit 13b' controls electric power supply in response to receiving a power failure detection signal from the receiver unit 13a. More specifically, the electric power supply control unit 13b' controls to supply, to the DC link unit 11d, electric power for driving the motor 3 in order to retract the driven body 4 to be driven by the motor 3 in response to receiving a power failure detection signal from the receiver unit 13a. FIG. 4 is a detailed diagram of the electric power supply control unit illustrated in FIG. 2. As illustrated in FIG. 4, the electric power supply control unit 13b' is connected in parallel to the DC link unit 11d, and has a DC-DC converter 22a, a controller 22b, and a capacitor 22c.

The controller 22b performs on-off operations of a switch (not illustrated) included in the DC-DC converter 22a in order to supply part of the electric power accumulated in the DC link unit 11d to the capacitor 22c during a time when the receiver unit 13a does not receive a power failure detection signal.

Further, the controller 22b performs on-off operations of the switch (not illustrated) included in the DC-DC converter 22a in order to supply the electric power accumulated in the capacitor 22c to the DC link unit 11d in response to receiving a power failure detection signal from the receiver unit 13a.

In this way, performing on/off operations of the switch (not illustrated) included in the DC-DC converter 22a makes it possible to supply, to the DC link unit 11d, electric power for driving the motor 3 in order to retract the driven body 4 to be driven by the motor 3 in power failure of the 3-phase AC power supply 1 at the time of driving the motor 3.

Further, according to the embodiment, the controller 22b performs on/off operations of the switch (not illustrated) included in the DC-DC converter 22a in order to supply regenerative energy generated at the time of driving and decelerating the motor 3 to the capacitor 22c.

The electric power supply control unit 13b' controls to supply, to a control power supply 31 which will be described later for supplying electric power to the control unit 12b, electric power for driving the control unit 12b in order to control the motor 3 so that an operation of stopping the motor 3 or an operation of retracting the driven body 4 to be driven by the motor 3 is performed in response to receiving a power failure detection signal from the receiver unit 13a.

Figure 5:
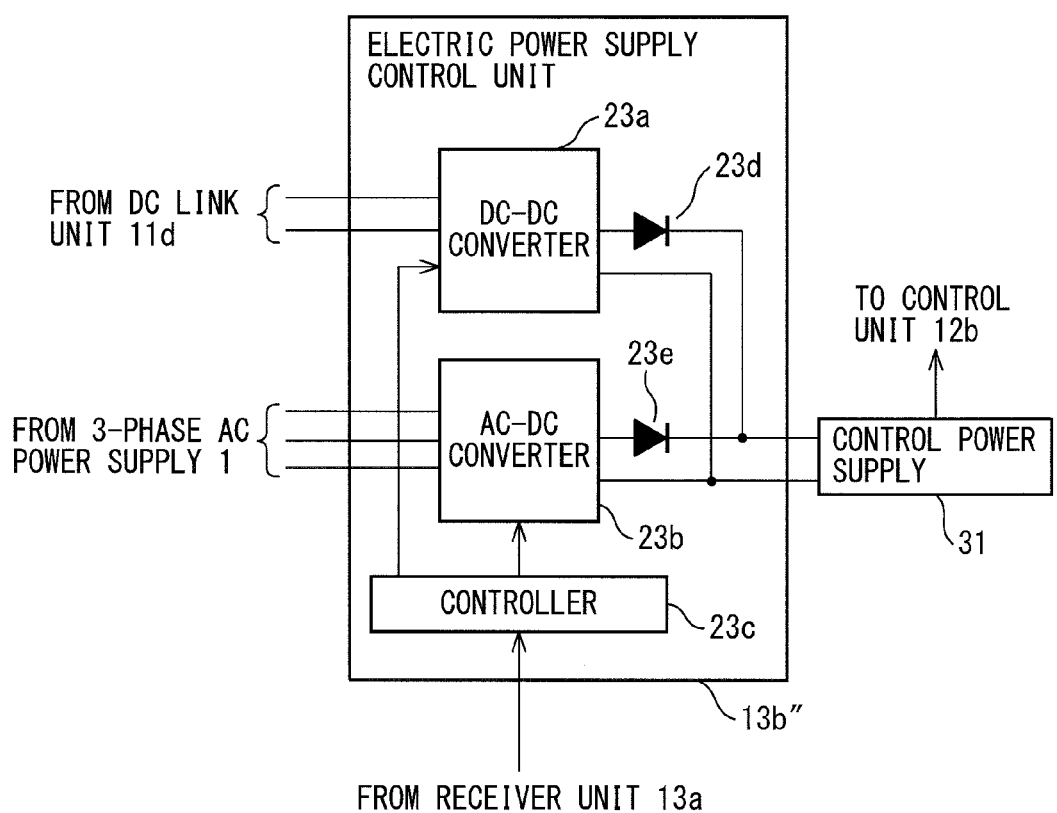
FIG. 5 is a detailed diagram of another electric power supply control unit illustrated in FIG. 2.

FIG. 5 is a detailed diagram of another electric power supply control unit illustrated in FIG. 2. As illustrated in FIG. 5, the electric power supply control unit 13b" is connected in parallel to the DC link unit 11d, and has a DC-DC converter 23a, an AC-DC converter 23b, and a controller 23c. Further, referring to FIG. 5, a diode 23d is disposed between the DC-DC converter 23a and the control power supply 31, and a diode 23e is disposed between the AC-DC converter 23b and the control power supply 31.

The controller 23c turns off a switch (not illustrated) included in the DC-DC converter 23a during time when the receiver unit 13a does not receive a power failure detection signal, and performs on-off operations of a switch (not illustrated) included in the AC-DC converter 23b in order to convert AC power to be supplied from the 3-phase AC power supply 1 to the control unit 31 into DC power.

Further, the controller 23c performs on-off operations of the switch (not illustrated) included in the DC-DC converter 23a in order to supply part of the electric power accumulated in the DC link unit 11d to the control power supply 31 in response to receiving a power failure detection signal from the receiver unit 13a, and turns off the switch (not illustrated) included in the AC-DC converter 23b.

In this way, the controller 23c performs on/off operations of the switch (not illustrated) included in the DC-DC converter 23a in response to receiving a power failure detection signal from the receiver unit 13a, whereby it is possible to supply, to the control power supply 31, electric power for the control unit 12b to control the motor 3 so that an operation of stopping the motor 3 or an operation of retracting the driven body 4 to be driven by the motor 3 is performed in power failure of the 3-phase AC power supply 1 at the time of driving the motor 3.

In the embodiment, the power failure detection unit 11a, the transmitter unit 11b, and the control unit 12b are implemented by a third processor (not illustrated) provided with an input/output port, a serial communication circuit, an A/D converter, and a comparator for detecting power failure of the 3-phase AC power supply 1 in accordance with a power failure detection program stored in a memory (not illustrated), and for executing control of the motor 3 in accordance with a motor control program stored in a memory (not illustrated).

Further, in the embodiment, the receiver unit 13a and the controllers 21b, 22b, 23c are implemented by a fourth processor (not illustrated) provided with an input/output port, a serial communication circuit, an A/D converter, and a comparator for executing control of regenerative electric power consumption in accordance with a regenerative electric power consumption control program stored in a memory (not illustrated), for supplying electric power to the DC link unit 11d in accordance with an electric power supply program stored in a memory (not illustrated), and for supplying electric power to the control power supply 31 in accordance with an electric power supply program stored in a memory (not illustrated).

According to the embodiment, it is not necessary to provide a power failure detection unit for each of the device 14 and the electric power management device 13 constituted as individual devices. As described above, detecting power failure of the 3-phase AC power supply 1 on the device 14 side, and transmitting a power failure detection signal from the transmitter unit 11b in the device 14 to the receiver unit 13a in the electric power management device 13 using a cable, radio, or an optical fiber does not require complicated control for power failure management so that adverse effects due to different power failure detection timings by power failure detection units do not affect control of the motor 3. The above configuration is advantageous in simplifying the control for power failure management in power failure of the 3-phase AC power supply 1 at the time of driving the motor 3, and in easily extending power failure management. Further, providing one power failure detection unit 11a in place of a plurality of power failure detection units makes it possible to simplify the system illustrated in FIG. 2. This is advantageous in reducing the cost for power failure management.

Figure 6:
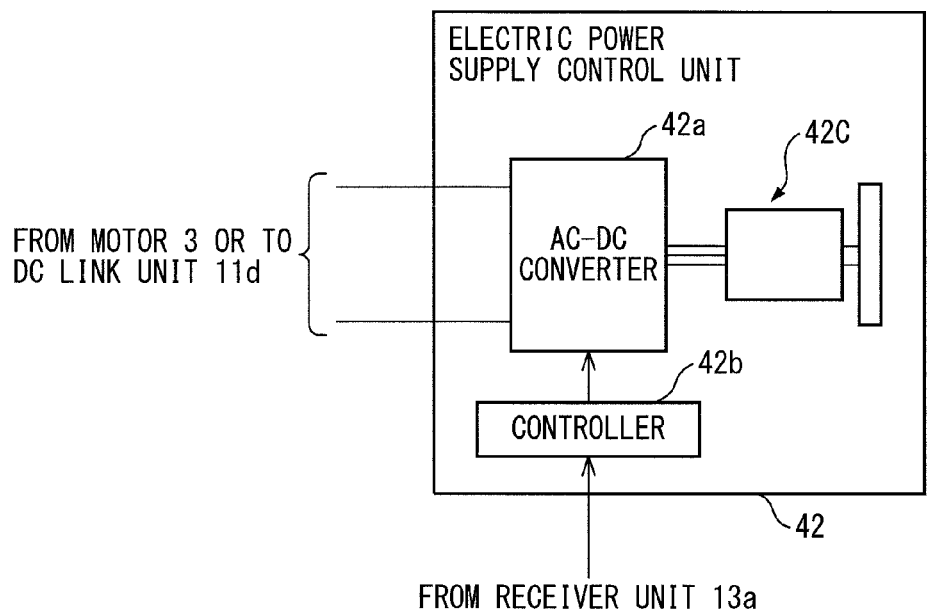
FIG. 6 is a detailed diagram of a modification of the electric power supply control unit illustrated in FIG. 2.

FIG. 6 is a detailed diagram of a modification of the electric power supply control unit illustrated in FIG. 2. An electric power supply control unit 42 illustrated in FIG. 6 is used in place of the electric power supply control unit 13b' illustrated in FIG. 2. As illustrated in FIG. 6, the electric power supply control unit 42 is connected in parallel to the DC link unit 11d, and has an AC-DC converter 42a, a controller 42b, and a motor with flywheel 42c.

The controller 42b is configured to decelerate a motor with flywheel 42c by performing on/off operations of a switch (not illustrated) included in the AC-DC converter 42a in response to receiving a power failure detection signal from the receiver unit 13a. Decelerating the motor with flywheel 42c as described above generates electric power, and the generated regenerative electric power is supplied to the DC link unit 11d.

In this way, performing on/off operations of the switch (not illustrated) included in the AC-DC converter 42a makes it possible to supply, to the DC link unit 11d, electric power for driving the motor 3 in order to retract the driven body 4 to be driven by the motor 3 in power failure of the 3-phase AC power supply 1 at the time of driving the motor 3.

Further, the electric power supply control unit 42 is configured such that the controller 42b performs on/off operations of the switch (not illustrated) included in the AC-DC converter 42a in such a manner that the motor with flywheel 42c is accelerated for consuming regenerative energy generated at the time of driving and decelerating the motor 3.

Figure 7:
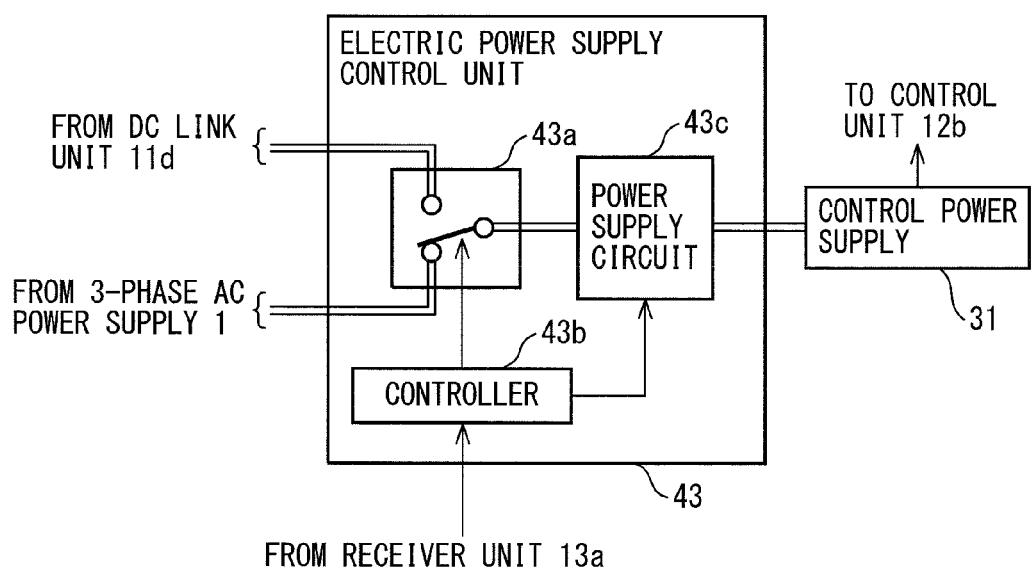
FIG. 7 is a detailed diagram of a modification of the another electric power supply control unit illustrated in FIG. 2.

FIG. 7 is a detailed diagram of a modification of the another electric power supply control unit illustrated in FIG. 2. An electric power supply control unit 43 illustrated in FIG. 7 is used in place of the electric power supply control unit 13b'' illustrated in FIG. 2. As illustrated in FIG. 7, the electric power supply control unit 43 is connected in parallel to the DC link unit 11d, and has a switch 43a, a controller 43b, and a power supply circuit 43c.

The controller 43b controls the switch 43a and the power supply circuit 43c so that the 3-phase AC power supply 1 is connected to the control power supply 31 via the switch 43a and an AC-DC converter (not illustrated) included in the power supply circuit 43c during a time when the receiver unit 13a does not receive a power failure detection signal. The controller 43b performs on/off operations of a switch (not illustrated) included in the AC-DC converter (not illustrated) included in the power supply circuit 43c so that AC power to be supplied from the 3-phase AC power supply 1 is converted into DC power to be supplied to the control power supply 31.

Further, the controller 43b controls the switch 43a and the power supply circuit 43c so that the DC link unit 11d is connected to the control power supply 31 via the switch 43a and a DC-DC converter (not illustrated) included in the power supply circuit 43c in response to receiving a power failure detection signal from the receiver unit 13a. The controller 43b performs on/off operations of the switch (not illustrated) included in the AC-DC converter (not illustrated) included in the power supply circuit 43c in order to supply part of the electric power accumulated in the DC link unit 11d to a capacitor (not illustrated) included in the control power supply 31.

In this way, the controller 43b performs on/off operations of the switch (not illustrated) included in the AC-DC converter (not illustrated) included in the power supply circuit 43c in response to receiving a power failure detection signal from the receiver unit 13a, whereby it is possible to supply, to the control power supply 31, electric power for the control unit 12b to control the motor 3 so that an operation of stopping the motor 3 or an operation of retracting the driven body 4 to be driven by the motor 3 is performed in power failure of the 3-phase AC power supply 1 at the time of driving the motor 3.

Figure 8:
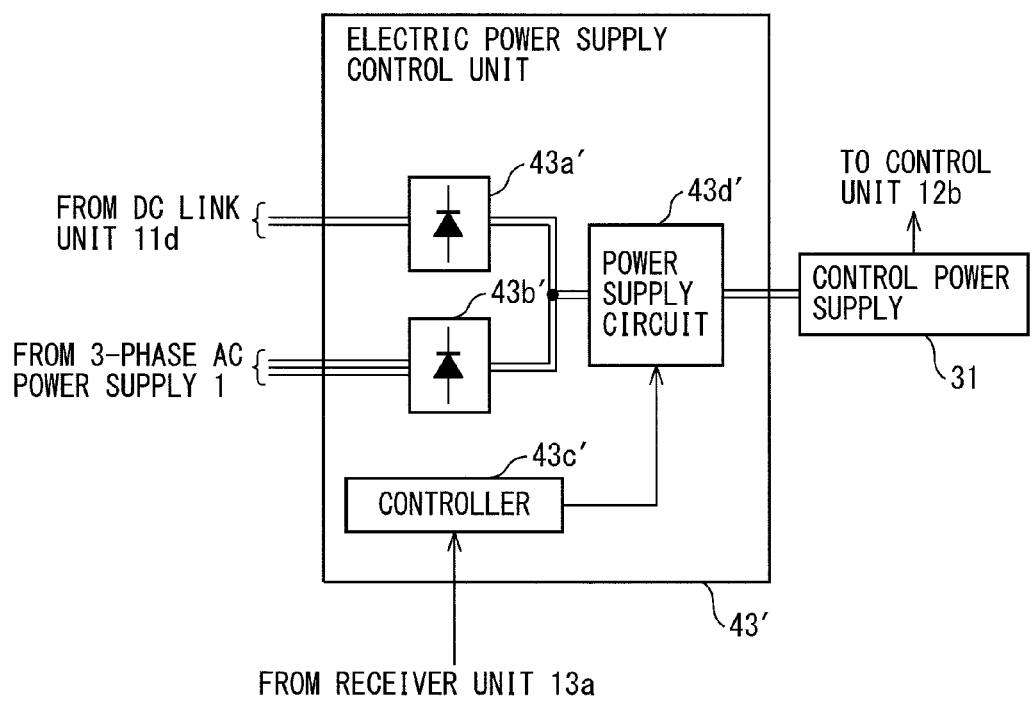
FIG. 8 is a detailed diagram of a modification of the another electric power supply control unit illustrated in FIG. 2.

FIG. 8 is a detailed diagram of a modification of the another electric power supply control unit illustrated in FIG. 2. An electric power supply control unit 43' illustrated in FIG. 8 is used, for example, in place of the electric power supply control unit 13b'' illustrated in FIG. 2. As illustrated in FIG. 8, the electric power supply control unit 43' is connected in parallel to the DC link unit 11d, and has rectifier circuits 43a', 43b', a controller 43c', and a power supply circuit 43d'.

The controller 43c' performs on/off operations of a switch (not illustrated) included in a DC-DC converter (not illustrated) included in the power supply circuit 43d' so that DC power to be obtained by rectifying AC power to be supplied from the 3-phase AC power supply 1 by the rectifier circuit 43a' is supplied to the control power supply 31 during a time when the receiver unit 13a does not receive a power failure detection signal.

Further, the controller 43c' performs on/off operations of the switch (not illustrated) included in the DC-DC converter (not illustrated) included in the power supply circuit 43d' so that DC power to be obtained by rectifying DC power to be supplied from the DC link unit 11d by the rectifier circuit 43b' is supplied to the control power supply 31 in response to receiving a power failure detection signal from the receiver unit 13a.

In this way, the controller 43c' performs on/off operations of the switch (not illustrated) included in the DC-DC converter (not illustrated) included in the power supply circuit 43d' in response to receiving a power failure detection signal from the receiver unit 13a, whereby it is possible to supply, to the control power supply 31, electric power for the control unit 12b to control the motor 3 so that an operation of stopping the motor 3 or an operation of retracting the driven body 4 to be driven by the motor 3 is performed in power failure of the 3-phase AC power supply 1 at the time of driving the motor 3.

Figure 9:
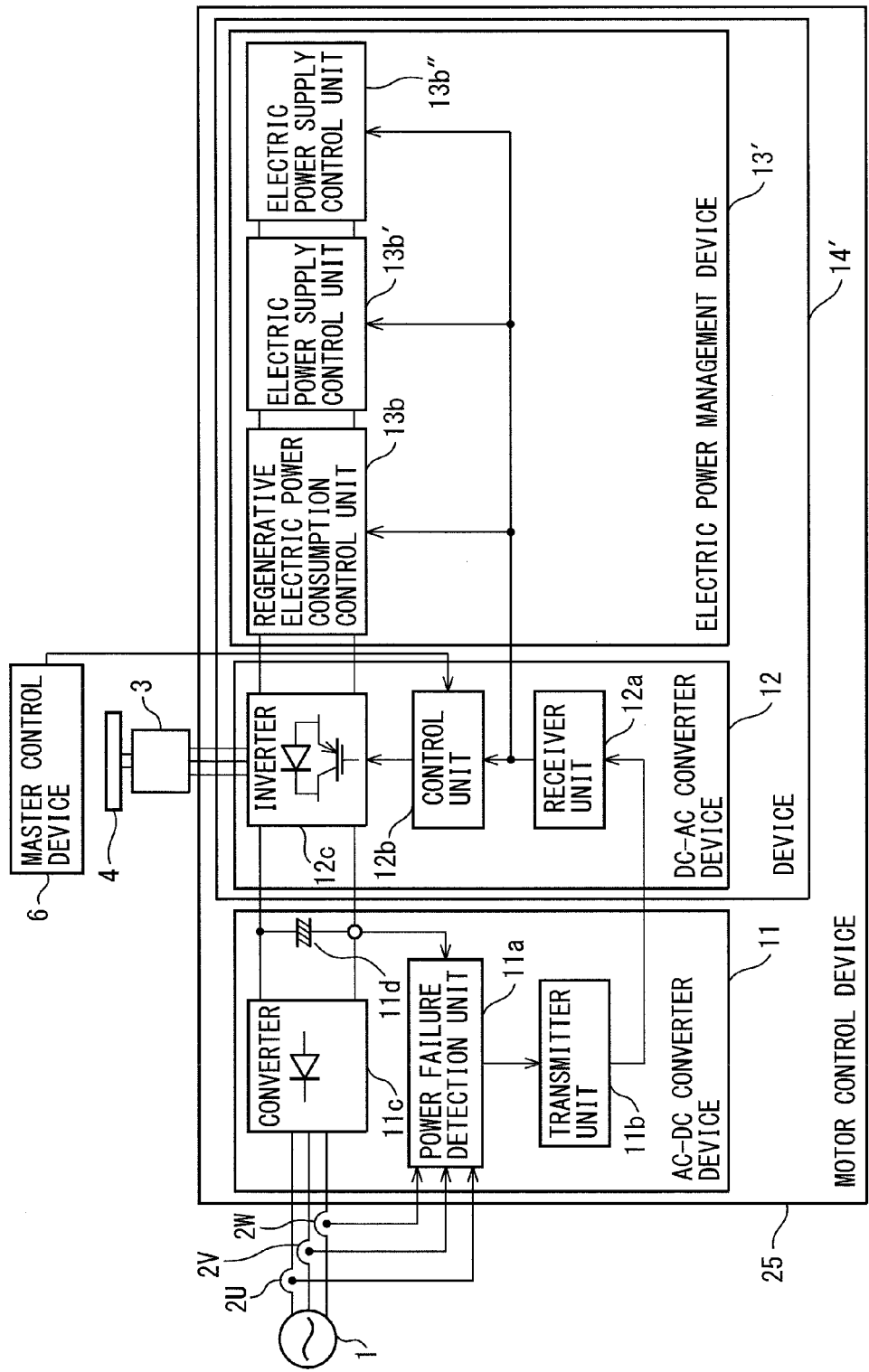
FIG. 9 is a diagram illustrating a system provided with a motor control device according to a third embodiment.

FIG. 9 is a diagram illustrating a system provided with a motor control device according to a third embodiment. The system illustrated in FIG. 9 is provided with a 3-phase AC power supply 1, voltage detectors 2U, 2V, 2W, a motor 3, a driven body 4, a motor control device 25, and a master control device 6.

The motor control device 25 is provided with an AC-DC converter device 11 as a first device, a DC-AC converter device 12, and an electric power management device 13'. The electric power management device 13' has a regenerative electric power consumption control unit 13b, an electric power supply control unit 13b', and an electric power supply control unit 13b". In the embodiment, the DC-AC converter device 12 and the electric power management device 13' connected thereto constitute a device 14' as a second device.

In the embodiment, the motor control device 25 is configured to detect power failure of the 3-phase AC power supply 1 at the time of driving the motor 3, and to control the motor 3 so that an operation of stopping the motor 3 or an operation of retracting the driven body 4 to be driven by the motor 3 is performed in accordance with detection of power failure; and to provide electric power management in power failure of the 3-phase AC power supply 1 at the time of driving the motor 3.

In order to perform the above control, a transmitter unit 11b is configured to transmit a power failure detection signal to a receiver unit 12a using a cable, radio, or an optical fiber, a control unit 12b controls the motor 3 so that an operation of stopping the motor 3 or an operation of retracting the driven body 4 to be driven by the motor 3 is performed in response to receiving a power failure detection signal from the receiver unit 12a, and the electric power management device 13' provides electric power management in power failure of the 3-phase AC power supply 1 at the time of driving the motor 3 in response to receiving the power failure detection signal from the receiver unit 12a.

In the embodiment, the receiver unit 12a, the control unit 12b, and controllers 21b, 22b, 23c are implemented by a fifth processor (not illustrated) provided with an input/output port, a serial communication circuit, an A/D converter, and a comparator for executing control of the motor 3 in accordance with a motor control program stored in a memory (not illustrated), for executing control of regenerative electric power consumption in accordance with a regenerative electric power consumption control program stored in a memory (not illustrated), for supplying electric power to a DC link unit 11d in accordance with an electric power supply program stored in a memory (not illustrated), and for supplying electric power to a control power supply 31 in accordance with an electric power supply program stored in a memory (not illustrated).

According to the embodiment, it is not necessary to provide a power failure detection unit for each of the AC-DC converter device 11 and the device 14' constituted as individual devices. As described above, detecting power failure of the 3-phase AC power supply 1 on the AC-DC converter device 11 side, and transmitting a power failure detection signal from the transmitter unit 11b in the AC-DC converter device 11 to the receiver unit 12a in the device 14' using a cable, radio, or an optical fiber does not require complicated control for power failure management so that adverse effects due to different power failure detection timings by power failure detection units do not affect control of the motor 3. The above configuration is advantageous in simplifying the control for power failure management in power failure of the 3-phase AC power supply 1 at the time of driving the motor 3, and in easily extending power failure management. Further, providing one power failure detection unit 11a in place of a plurality of power failure detection units makes it possible to simplify the system illustrated in FIG. 9. This is advantageous in reducing the cost for power failure management.

Figure 10:
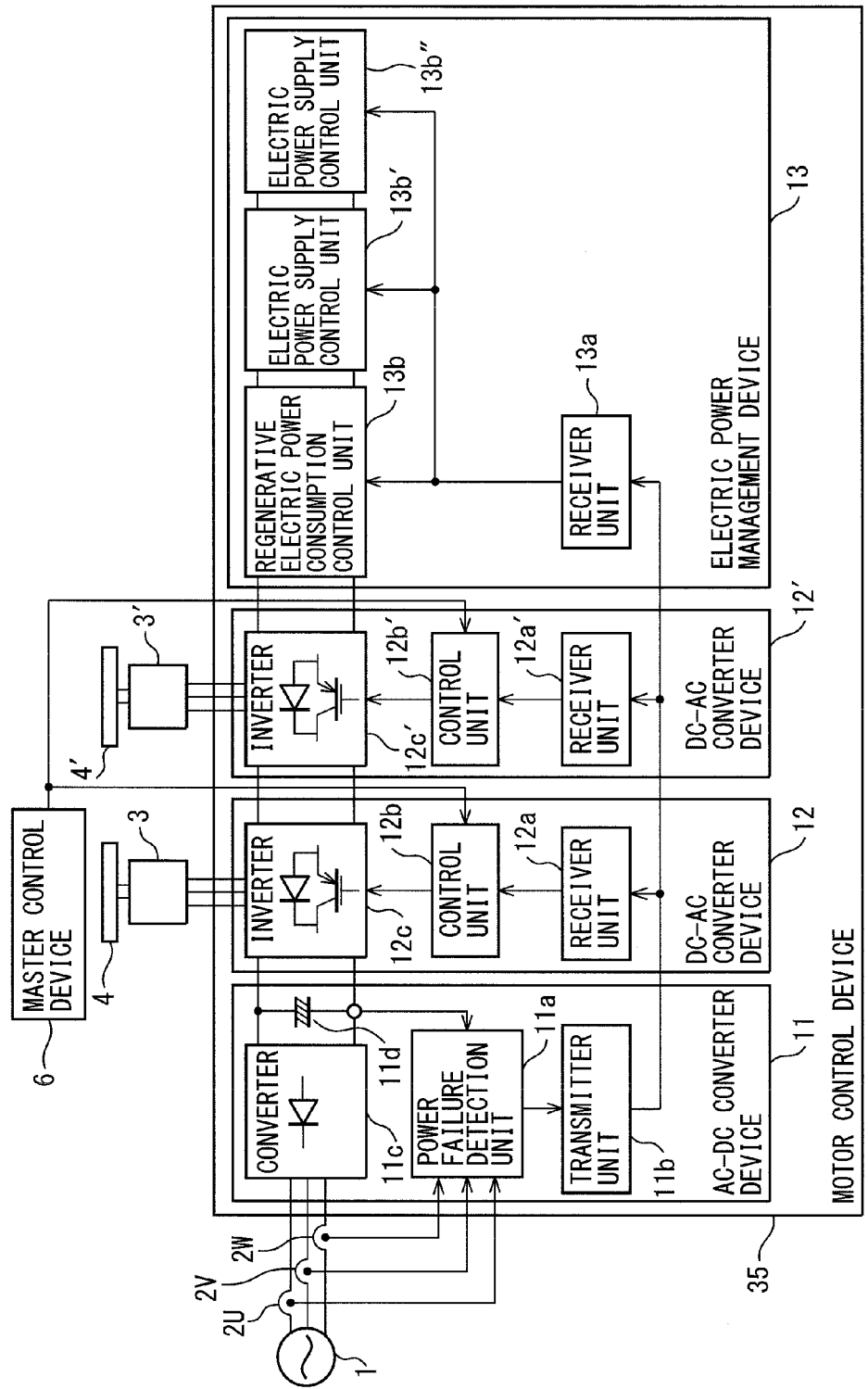
FIG. 10 is a diagram illustrating a system provided with a motor control device according to a fourth embodiment.

FIG. 10 is a diagram illustrating a system provided with a motor control device according to a fourth embodiment. The system illustrated in FIG. 10 is provided with a 3-phase AC power supply 1, voltage detectors 2U, 2V, 2W, motors 3, 3', driven bodies 4, 4', a motor control device 35, and a master control device 6.

Examples of the motor 3' include a gravity axis servo motor configured to drive the main shaft of a machine tool in the gravity axis direction (in Z-axis direction) by a screw feeding mechanism such as a ball screw/nut mechanism, a main shaft motor configured to drive a tool mounted on the main shaft of a machine tool, and a horizontal axis servo motor configured to drive a table of a machine tool on which a workpiece is mounted in the horizontal axis direction (e.g. in X-axis direction) by a screw feeding mechanism such as a ball screw/nut mechanism.

The driven body 4' may be the main shaft of a machine tool when the motor 3' is a gravity axis servo motor, may be a tool when the motor 3' is a main shaft motor, and may be a table of a machine tool when the motor 3' is a horizontal axis servo motor.

The motor control device 35 is provided with an AC-DC converter device 11 as a first device, a DC-AC converter device 12 as a second device, a DC-AC converter device 12' as a second device, and an electric power management device 13 as a second device. The DC-AC converter device 12' has a receiver unit 12a', a control unit 12b', and an inverter 12c'.

The receiver unit 12a' is constituted of an input/output port, for instance, and is configured to receive a power failure detection signal transmitted from a transmitter unit 11b. The control unit 12b' is configured to generate a PWM signal for driving the motor 3', based on current values of currents of three phases, namely, U-phase current, V-phase current, and W-phase current detected by a current detector (not illustrated) provided on the output line of the inverter 12c', a position of the motor 3' detected by a position detector (not illustrated), a speed of the motor 3' to be determined based on the position of the motor 3', a position command value to be input from the master control device 6, and a speed command value to be determined based on the position command value; and to output the generated PWM signal to the inverter 12c'.

The inverter 12c' is constituted of a plurality of (six in 3-phase AC power supply) rectifier diodes and transistors connected in reverse parallel to the respective corresponding rectifier diodes, for instance. The inverter 12c' is connected in parallel to a DC link unit 11d, and is configured to convert DC power converted by a converter 11c into AC power for driving the motor 3' by performing on-off operations of the transistors based on the PWM signal.

According to the embodiment, the receiver unit 12a' and the control unit 12b' are implemented by a fifth processor (not illustrated) provided with an input/output port, a serial communication circuit, an A/D converter, and a comparator for executing control of the motor 3' in accordance with a motor control program stored in a memory (not illustrated).

According to the embodiment, it is not necessary to provide a power failure detection unit for each of the AC-DC converter device 11, the DC-AC converter device 12, the DC-AC converter device 12', and the electric power management device 13 constituted as individual devices. As described above, detecting power failure of the 3-phase AC power supply 1 on the AC-DC converter device 11 side, and transmitting a power failure detection signal from the transmitter unit 11b in the AC-DC converter device 11 to a receiver unit 12a in the DC-AC converter device 12, to the receiver unit 12a' in the DC-AC converter device 12', and to a receiver unit 13a in the electric power management device 13 using a cable, radio, or an optical fiber does not require complicated control for power failure management so that adverse effects due to different power failure detection timings by power failure detection units do not affect control of the motors 3, 3'. Thus, even when the DC-AC converter device 12, the DC-AC converter device 12', and the electric power management device 13 corresponding to a plurality of second devices are used with respect to the AC-DC converter device 11 corresponding to one first device, it is possible to simplify the control for power failure management in power failure of the 3-phase AC power supply 1 at the time of driving the motor 3, and to easily extend power failure management. Further, providing one power failure detection unit 11a in place of a plurality of power failure detection units makes it possible to simplify the system illustrated in FIG. 10. This is advantageous in reducing the cost for power failure management.

The invention is not limited to the embodiments, and various modifications and alterations are applicable. For instance, the motor control device of the invention is applicable to a machine other than a machine tool or to an industrial robot. Further, the motor control device of the invention is also applicable to a configuration, in which power regeneration is performed at the time of decelerating the motor 3, and power regeneration is interrupted in power failure of the 3-phase AC power supply 1 at the time of driving the motor 3.

Further, in the embodiments, the electric power management device 13 includes the regenerative electric power consumption control unit 13b, the electric power supply control unit 13b', and the electric power supply control unit 13b". Alternatively, the electric power management device 13 may include at least one of the regenerative electric power consumption control unit 13b, the electric power supply control unit 13b', and the electric power supply control unit 13b". Further, the control power supply 31 may supply electric power to the constituent elements (e.g. the controllers 21b, 22b, 23c) other than the control unit 12b.

Further, a power failure detection signal may be transmitted from the transmitter unit 11b to a receiver unit (not illustrated) in the master control device 6 using a cable, radio, or an optical fiber, the master control device 6 may output a command to the control unit 12b in response to the power failure detection signal, and the control unit 12b may control the motor 3 so that an operation of stopping the motor 3 or an operation of retracting the driven body 4 to be driven by the motor 3 is performed in response to the command. Further, the power failure detection unit 11a may determine power failure, based on the amplitude or the frequency of voltages of three phases i.e., U-phase voltage, V-phase voltage, and W-phase voltage.

In the embodiments, one motor 3 is controlled, or two motors 3, 3' are controlled. The motor control device of the invention is also applicable to a configuration, in which three or more motors are controlled.

According to the invention, it is possible to provide one power failure detection unit in a first device, in place of providing a plurality of power failure detection units, and to transmit a power failure detection signal generated in the one power failure detection unit to a second device, using a cable, radio, or an optical fiber. According to the above configuration, even if there are provided a plurality of second devices, it is possible to eliminate adverse effects due to different power failure detection timings, to easily provide power failure management of AC power supply at the time of driving a motor, and to simplify the control for power failure management. Further, it is possible to provide power failure management of AC power supply at the time of driving a motor with use of one power failure detection signal. This is advantageous in easily extending a power failure management device. Further, according to the invention, it is possible to reduce the number of steps for power failure management, and to reduce the number of components. This is advantageous in reducing the cost.

It is further noted that in an exemplary embodiment, there is a motor control device for controlling a motor to be driven by energy of a DC link unit connected to an AC power supply via a converter, the motor control device comprising one first device including a power failure detection unit configured to detect power failure of the AC power supply at a time of driving the motor and to generate a power failure detection signal in accordance with detection of power failure, and a transmitter unit configured to transmit the power failure detection signal, and at least one second device including a receiver unit configured to receive the power failure detection signal transmitted from the transmitter unit.

What is claimed is:
1. A motor control device which is connected to an AC power supply and used for a machine tool or an industrial robot which drives a driven body by controlling at least one motor, wherein the motor control device is provided with a power failure management function for use during an AC power supply failure at the time of driving the at least one motor, and wherein the at least one motor is controlled to perform at least one of stopping the at least one motor and retracting the driven body which is controlled by the at least one motor, the motor control device comprising:
a first device including an AC-DC converter device equipped with a converter and DC link unit configured to convert AC power into DC power;
a second device connected to the first device including a DC-AC converter device and a control unit thereof, which is configured to output AC power to the at least one motor by converting DC power from the DC link unit into AC power by the DC-AC converter which is controlled by the control unit,
wherein:
the first device includes a power failure detection unit configured to detect power failure of the AC power supply at a time of driving the at least one motor and to generate a power failure detection signal in accordance with a detection of power failure, and a transmitter unit configured to transmit the power failure detection signal,
the second device includes a receiver unit configured to receive the power failure detection signal transmitted from the transmitter unit and transmit the detection signal to the control unit, and the control unit is configured to perform either stopping the at least one motor in response to receiving the power failure detection signal or retracting the driven body which is driven by the at least one motor, and
the motor control device further includes a plurality of additional second devices therein and each additional second device of the plurality of second devices is equipped with a receiver unit for receiving the power failure detection signal and configured to provide power failure management during power failure of the AC power supply;

when the power failure detection unit transmits a power failure detection signal during power failure of the AC power supply to a plurality of receiver units provided in each of the second device and the plurality of additional second devices, it is power failure management is provided in each of the second device and the plurality of additional second devices at the same timing of receiving the power failure detection signal, and power failure management is extended.

2. The motor control device according to claim 1, wherein the type and the number of the second device and the at least one additional second device of the plurality of additional second devices connected to the first device is determined in accordance with the type of the power failure management at the time of driving the at least one motor and electric power or energy for driving the at least one motor.

3. The motor control device according to claim 1, wherein the transmitter unit transmits the power failure detection signal to the receiver unit using a cable, radio, or an optical fiber.

4. A motor control device which is connected to an AC power supply and used for a machine tool or an industrial robot which drives a driven body by controlling at least one motor, wherein the motor control device being provided with power failure management during AC power supply failure at the time of driving the at least one motor, and wherein the at least one motor is controlled to perform at least one of stopping the at least one motor and retracting the driven body which is controlled by the at least one motor, the motor control device comprising:

a first device including an AC-DC converter device equipped with a converter and DC link unit for converting AC power into DC power, a DC-AC converter device connected to the AC-DC converter device and a control unit of the DC-AC converter, and the DC-AC converter converts DC power from the DC link unit into AC power and outputs it to the motor;

a plurality of second devices with at least one second device of the plurality of second devices connected to the first device including an electric power management device, wherein:

the AC-DC converter device includes a power failure detection unit configured to detect power failure of the AC power supply at a time of driving the at least one motor and to generate a power failure detection signal in accordance with detection of power failure, and a transmitter unit configured to transmit the power failure detection signal, the control unit provided in the DC-AC converter is configured to receive the power failure detection signal transmitted from the transmitter unit and perform either stopping the at least one motor in response to receiving the power failure detection signal or retracting the driven body which is driven by the at least one motor, each second device of the plurality of second devices includes a receiver unit configured to receive the power failure detection signal transmitted from the transmitter unit and transmit the power failure detection signal to the electric power management device;

the electric power management device is provided in at least one second device of the plurality of second devices and includes a regenerative electric power consumption control unit and a plurality of electric power supply control units and performs at least one of the regenerative electric power consumption control which controls the consumption of regenerative energy generated at the time of decelerating the motor and the electric power supply control which controls the electric power supply to a control power supply unit or a DC link unit as a provision of electric power management in power failure of AC power supply at the time of driving the motor in response to receiving the power failure detection signal, and when the power failure detection unit transmits a power failure detection signal in power failure of the AC power supply to a plurality of receiver units, power failure management is provided in each second device of the plurality of second devices at the same timing of receiving the power failure detection signal, resulting in extension of power failure management.

5. The motor control device according to claim 4, wherein the motor control device further includes a plurality of additional second devices and each of the additional second devices of the plurality of additional second devices includes a receiver unit for receiving the power failure detection signal; and the power failure management is performed in all of the other second devices of the plurality of second devices during AC power supply failure at the time of driving the at least one motor.

6. A motor control device which is connected to an AC power supply and used for a machine tool or an industrial robot which drives a driven body by controlling at least one motor, wherein the motor control device being provided with power failure management during AC power supply failure at the time of driving the at least one motor, and wherein the at least one motor is controlled to perform at least one of stopping the at least one motor and retracting the driven body which is controlled by the at least one motor, the motor control device comprising:

a first device including an AC-DC converter device equipped with a converter and DC link unit for converting AC power into DC power;

a plurality of second devices with at least one second device of the plurality of second devices connected to the first device including a DC-AC converter device, a control unit thereof and an electric power management device, which outputs AC power to the at least one motor by converting DC power from the DC link unit into AC power by the DC-AC converter which is controlled by the control unit, wherein:

the first device includes a power failure detection unit configured to detect power failure of the AC power supply at a time of driving the motor and to generate a power failure detection signal in accordance with detection of power failure, and a transmitter unit configured to transmit the power failure detection signal, each second device of the plurality of second devices includes a receiver unit configured to receive the power failure detection signal transmitted from the transmitter unit and transmit the power failure detection signal to the control unit, the control unit is configured to perform either stopping the at least one motor in response to receiving the power failure detection signal or retracting the driven body which is driven by the at least one motor, and the electric power management device includes a regenerative electric power consumption control unit and a plurality of electric power supply control units and performs at least one of the regenerative electric power consumption control which controls the consumption of regenerative energy generated at the time of decelerating the motor and the electric power supply control which controls the electric power supply to a control power supply unit or a DC link unit as a provision of electric power management during power failure of AC power supply at the time of driving the at least one motor in response to receiving the power failure detection signal, and when the power failure detection unit transmits a power failure detection signal during power failure of the AC power supply to the plurality of receiver units, power failure management in each second device of the plurality of second devices is provided at a same timing of receiving the power failure detection signal, and power failure management is extended.

7. The motor control device according to claim 6, wherein the power failure management is performed in all of the second devices of the plurality of second devices during AC power supply failure at the time of driving the at least one motor.

8. The motor control device according to claim 4, wherein the type and the number of the second devices of the plurality of second devices connected to the first device is determined in accordance with the type of the power failure management at the time of driving the at least one motor and electric power or energy for driving the at least one motor.

9. The motor control device according to claim 6, wherein the type and the number of second devices of the plurality of second devices connected to the first device is determined in accordance with the type of the power failure management at the time of driving the at least one motor and electric power or energy for driving the at least one motor.

* * * * *